United States Patent
Seewald

(10) Patent No.: US 12,432,256 B2
(45) Date of Patent: Sep. 30, 2025

(54) DYNAMIC SECURITY POLICY AND KEY MANAGEMENT FOR CONVERGED NETWORKS

(71) Applicant: Cisco Technology, Inc., San Jose, CA (US)

(72) Inventor: Maik Guenter Seewald, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 18/134,729

(22) Filed: Apr. 14, 2023

(65) Prior Publication Data
US 2024/0348651 A1   Oct. 17, 2024

(51) Int. Cl.
*H04L 29/06* (2006.01)
*H04L 9/40* (2022.01)

(52) U.S. Cl.
CPC .......... *H04L 63/20* (2013.01); *H04L 63/0263* (2013.01); *H04L 63/0435* (2013.01)

(58) Field of Classification Search
CPC . H04L 63/0435; H04L 63/0263; H04L 63/10; H04L 63/20; H04L 63/062; H04L 63/126
See application file for complete search history.

(56) References Cited

U.S. PATENT DOCUMENTS

| | | | |
|---|---|---|---|
| 8,272,041 B2 * | 9/2012 | Hamilton, II | H04L 63/0263 713/153 |
| 11,096,196 B2 * | 8/2021 | Barton | H04W 4/70 |
| 2020/0137097 A1 | 4/2020 | Zimmermann et al. | |
| 2020/0259896 A1 | 8/2020 | Sachs et al. | |
| 2022/0345415 A1 | 10/2022 | Ko et al. | |
| 2022/0345417 A1 | 10/2022 | Kasichainula et al. | |

OTHER PUBLICATIONS

Cheruvu, S., Kumar, A., Smith, N., & Wheeler, D. M. (2020). Connectivity technologies for IoT. In Demystifying internet of things security (pp. 347-411). Apress, Berkeley, CA.

* cited by examiner

*Primary Examiner* — Longbit Chai
(74) *Attorney, Agent, or Firm* — Lee & Hayes, P.C.

(57) ABSTRACT

Techniques and architecture are described for dynamic security policy and key management for converged networks. More particularly, the techniques and architecture provide for configuring and managing converged industrial networks and configuring the converged industrial networks with respect to security policy and key management when also configuring and managing the converged industrial networks for operation. In configurations, the techniques and architecture described herein provide a method to establish dynamic access control as well as continuous trusted access and control based on well-defined streams and pre-calculated schedules. Additionally, in configurations, the techniques and architecture described herein provide a method to establish automated and integrated key management for controller-based time-sensitive networking (TSN) networks. This enables highly adaptable network security for operational technology (OT)/industrial Internet of Things (IIoT) networks used for critical processes such as automation and control.

19 Claims, 5 Drawing Sheets

DYNAMIC SECURITY POLICY AND KEY MANAGEMENT FOR CONVERGED NETWORKS

TECHNICAL FIELD

The present disclosure relates generally to dynamic security policy and key management for converged networks, and more particularly, to configuring and managing converged industrial networks and configuring the converged industrial networks with respect to security policy and key management when also configuring and managing the converged industrial networks for operation.

BACKGROUND

Standard Information technology network equipment has no concept of "time" and cannot provide synchronization and precision timing. Delivering data reliably is more important than delivering within a specific time, so there are no constraints on delay or synchronization precision. Even if the average hop delay is very low, individual delays can be unacceptably high. Network congestion is handled by throttling and retransmitting dropped packets at the transport layer, but there are no means to prevent congestion at the link layer. Data can be lost when the buffers are too small or the bandwidth is insufficient, but excessive buffering adds to the delay, which is unacceptable when low deterministic delays are required.

The different time-sensitive networking (TSN) standards specified by IEEE 802.1TSN, can be grouped into three basic key component categories that are required for a complete real-time communication solution based on switched Ethernet networks with deterministic quality of service (QoS) for point-to-point connections. Each and every standard specification can be used on its own and is mostly self-sufficient. However, only when used together in a concerted way, TSN as a communication system can achieve its full potential. The three basic components include time synchronization, scheduling and traffic shaping, selection of communication paths. For time synchronization, all devices that are participating in real-time communication need to have a common understanding of time. For scheduling and traffic shaping, all devices that are participating in real-time communication adhere to the same rules in processing and forwarding communication packets. For selection of communication paths, path reservations and fault-tolerance, all devices that are participating in real-time communication adhere to the same rules in selecting communication paths and in reserving bandwidth and time slots, possibly utilizing more than one simultaneous path to achieve fault-tolerance.

Network and protocol security are critical functional requirements for network convergence and plug and produce use cases in industrial networks deployed in automation and control scenarios. TSN provides capabilities to enable converged networking in related application domains. The controller-based model (using a central network controller (CNC) and a centralized user configuration (CUC)), as specified in TSN (Ethernet-based) and for W-TSN (Wi-Fi—based), supports the scheduling of the streams (connections between end stations of the industrial networks) as well as the configuration of the end stations and network devices (switches, routers, etc.). In combination with a configuration tool (e.g., the CUC), the usability will increase and networking configurations "with intent" appears to be achievable.

In current operational technology (OT)/industrial Internet of Things (IIoT) related technologies and applications, security configuration and management are handled completely separately from the network configuration. This is counterproductive because the majority of these industrial installations need security as an integrated part of the solution. It would be more efficient to combine network and security configurations including access control, key and certificate management.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
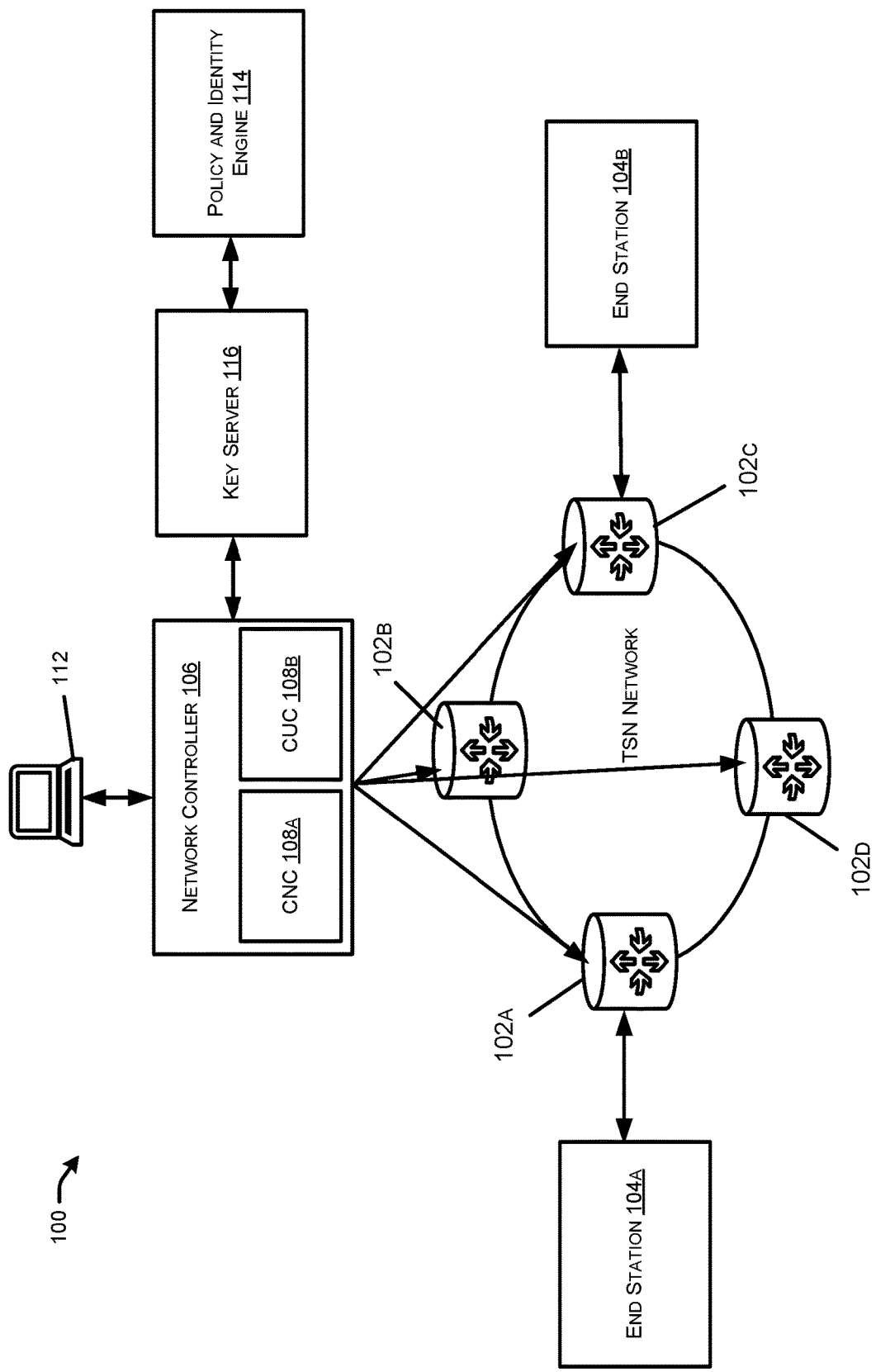
FIGS. 1A-1C schematically illustrate example arrangements of an industrial network that is configured as a converged industrial network, in accordance with techniques and architecture described herein.

The present disclosure provides techniques and architecture for dynamic security policy and key management for converged networks. More particularly, the techniques and architecture provide for configuring and managing converged industrial networks and configuring the converged industrial networks with respect to security policy and key management when also configuring and managing the converged industrial networks for operation. This combination allows a fine-granular security based on streams, and is adaptive to changes in the network configuration. In this respect, it enables continuous trusted access and controlled use beyond initial access control. Furthermore, this tightly integrated network and security configuration may be less error prone to misconfiguration, a common cause of security breaches. Thus, in configurations, the techniques and architecture described herein provide a method to establish dynamic access control as well as continuous trusted access and control based on well-defined streams and pre-calculated schedules. Additionally, in configurations, the techniques and architecture described herein provide a method to establish automated and integrated key management for controller-based TSN networks. This enables highly adaptable network security for Industrial IoT networks used for critical processes such as automation and control.

For example, in configurations, the techniques and architecture provide a converged and scheduled (time-sensitive) network that is based on the definition of streams between the end stations through a switched network or over wireless-TSN (scheduled WiFi-7). The schedule is based on an algorithm that determines the path through the network depending on network requirements such as bandwidth and latency. In a controller-based architecture, this is accomplished by a logical component (the CNC in the context of IEEE 802.1TSN). Part of this algorithm-based calculation is the configuration of the endpoints, the sender and receiver of the messages as streams. This configuration includes the source and destination medium access control (MAC) addresses as well as the stream-identifiers (IDs) (MAC address and virtual local area network (VLAN)-ID) for the individual streams. This exclusive "view" on the network, as well as on the streams, enables the fine granular access control as well as integrated and automated credential (key) management.

As an example, a method may include configuring, by a network controller, an industrial network comprising a plurality of end stations coupled together by a plurality of network devices configured as a time-sensitive networking (TSN) network. The configuring may comprise calculating paths and schedules through the TSN network based at least in part on information related to workflows between end stations of the plurality of end stations within the TSN network. Based at least in part on the configuring, a policy engine may receive end station identifiers (IDs), stream IDs, the paths, and the schedules from the network controller. Based at least in part on the end station IDs, the stream IDs, the paths, and the schedules, the policy engine may configure access control of the network devices with security policies comprising ingress filtering and firewall rules. Based at least in part on at least one of (i) removal of an end station from the industrial network, (ii) removal of one of the network devices from the industrial network, (iii) addition of a new end station to the industrial network, or (iv) addition of a new network device to the industrial network, the configuring of the industrial network may be dynamically repeated. The receiving of the end station identifiers, stream IDs, the paths, and the schedules may also be dynamically repeated, as well as the configuring of the access control.

Example Embodiments

In accordance with configurations described herein, as previously noted, the present disclosure provides techniques and architecture for dynamic security policy and key management for converged networks. More particularly, the techniques and architecture provide for configuring and managing converged industrial networks and configuring the converged industrial networks with respect to security policy and key management when also configuring and managing the converged industrial networks for operation. This combination allows a fine-granular security based on streams and is adaptive to changes in the network configuration. In this respect, it enables continuous trusted access and controlled use beyond initial access control. Furthermore, this tightly integrated network and security configuration may be less error prone to misconfiguration, a common cause of security breaches. Thus, in configurations, the techniques and architecture described herein provide a method to establish dynamic access control as well as continuous trusted access and control based on well-defined streams and pre-calculated schedules. Additionally, in configurations, the techniques and architecture described herein provide a method to establish automated and integrated key management for controller-based TSN networks. This enables highly adaptable network security for Industrial IoT networks used for critical processes such as automation and control.

For example, in configurations, the techniques and architecture provide a converged and scheduled (time-sensitive) network that is based on the definition of streams between the end stations through a switched network or over wireless-TSN (scheduled WiFi-7). The schedule is based on an algorithm that determines the path through the network depending on network requirements such as bandwidth and latency. In a controller-based architecture, this is accomplished by a logical component (the CNC in the context of IEEE 802.1TSN). Part of this algorithm-based calculation is the configuration of the endpoints, the sender and receiver of the messages as streams. This configuration includes the source and destination medium access control (MAC) addresses as well as the stream-identifiers (IDs) (MAC address and virtual local area network (VLAN)-ID) for the individual streams.

This exclusive "view" on the network, as well as on the streams, enables the fine granular access control as well as integrated and automated credential (key) management. This entails the following pre-conditions and initial steps. A converged network that is dynamically configured and scheduled based on a centralized controller connects end devices in an operational technology (OT) scenario (e.g., control and automation). A configuration (engineering) tool that is connected to the centralized controller (containing the CUC and the CNC) provides capabilities to define the underlying workflows in the OT solution and network. This includes the connectivity between endpoints and the related requirements pertaining to the workflows. Based on information derived from an engineering process, the controller calculates the path through the network. This path connects the end devices of the network and meets essential network requirements such as bandwidth and latency. Furthermore, the controller assigns the stream-IDs (MAC address+ VLAN-ID). The controller sends the information containing the scheduled traffic (referred to as schedules) to the endpoints as well as to the network devices (switches, routers, etc.). Based on the information containing the scheduled traffic, the controller is aware of all stream-IDs and all MAC addresses, e.g., the MAC addresses of the network devices as well as of the endpoints (end stations or end devices).

In configurations, for dynamic access control and use of the control, using the stream-IDs and MAC addresses, the controller provides the stream-IDs, the flows (commutated path) between the endpoints (end stations or end devices), and schedules to a policy engine. The policy engine configures the network devices (e.g., switches, routers, etc.) based on the stream-IDs, the flows (commutated path) between the endpoints (end stations or end devices), and schedules. This entails ingress filtering as well as firewall rules based on stream identification and handling, depending on network device capabilities. In addition to filtering and blocking, the known schedules allow access control capabilities based on timing aspects related to the streams. The entire process is dynamic and allows quick response and reconfiguration based on changes in the network and stream configuration, as well as changes to the schedules.

In configurations, for dynamic key management, using the stream-IDs and MAC addresses, the controller connects to a key server that provides key management functions. The controller provides information regarding the endpoints (MAC Addresses) and the flows (commutated path) between the endpoints (end stations or end devices). The key server generates the material (keys) and distributes the keys to the receiving entities. In configurations, a receiving entity may be, for example, the sender and receiver of a stream (the end devices). The keys may be used for transport or higher layer security. In configurations, a receiving entity may be, for example, all points of a stream (path through the network)

that includes the endpoints as well as the bridges (network devices). The keys may be used for Ethernet link layer security (e.g., IEEE 802.1AE). Following a successful key deployment and the establishment of protocol security, the flow definition through the network is complete and secured by the cryptographic means based on the distributed keys. In addition to security policies (such as key-renewal), any change to the flow definitions based on all points of a stream (path through the network) that includes the endpoints as well as the bridges (network devices) triggers the process of key generation and distributions again to address these changes and related security needs.

Accordingly, in configurations, a method includes configuring, by a network controller, an industrial network comprising a plurality of end stations coupled together by a plurality of network devices configured as a time-sensitive (TSN) network. The configuring comprises calculating paths and schedules through the TSN network based at least in part on information related to workflows between end stations of the plurality of end stations within the TSN network. Based at least in part on the configuring, a policy engine receives end station identifiers (IDs), stream IDs, the paths, and the schedules from the network controller. Based at least in part on the end station IDs, the stream IDs, the paths, and the schedules, the policy engine configures access control of the network devices with security policies comprising ingress filtering and firewall rules. Based at least in part on at least one of (i) removal of an end station from the industrial network, (ii) removal of one of the network devices from the industrial network, (iii) addition of a new end station to the industrial network, or (iv) addition of a new network device to the industrial network, the configuring of the industrial network is dynamically repeated. The receiving of the end station identifiers, stream IDs, the paths, and the schedules is also dynamically repeated, as well as the configuring of the access control.

In configurations, configuring the access control of the network devices further comprises configuring the access control of the network devices based on timing aspects related to streams between end stations.

In configurations, configuring the industrial network further comprises receiving, at the controller from an engineering tool, capabilities of the industrial network including connectivity between the plurality of end stations and related requirements pertaining to the workflows. In such configurations, configuring the industrial network is based at least in part on the capabilities of the industrial network including connectivity between the plurality of end stations and the related requirements pertaining to the workflows.

In configurations, calculating the paths and schedules is based at least in part on the capabilities of the industrial network including connectivity between the plurality of end stations and the related requirements pertaining to the workflows.

In configurations, the method further comprises based at least in part on the configuring, receiving, at a key server from the network controller, the end station IDs, stream IDs, the paths, and schedules. Based at least in part on the end station IDs, stream IDs, the paths, and the schedules, the key server generates one or more keys. The key server distributes the one or more keys to one or more receiving entities of the industrial network. In configurations, the one or more receiving entities comprise two or more end stations. In configurations, the one or more receiving entities comprise two or more end stations and one or more network devices.

In configurations, the method further comprises based at least in part on at least one of (i) removal of an end station from the industrial network, (ii) removal of one of the network devices from the industrial network, (iii) addition of a new end station to the industrial network, or (iv) addition of a new network device to the industrial network, dynamically repeating the receiving of the end station IDs, stream IDs, the paths, and the schedules, the generating of one or more keys, and the distributing of the one or more keys to the one or more receiving entities of the industrial network.

Thus, the techniques and architecture described herein allow for integration of the management of network security tightly into network management for converged networks. Configuration data is used to generate and manage key material, which is needed for the flows computed and configured by the centralized controller. This allows exact end-to-end security, e.g., encryption (depending on the use of the keys). In addition, any change in the configuration of the converged, scheduled network may be addressed and integrated automatically in order to manage the security credentials and to generate and provide new key material. This automates the security management and makes the entire network less prone to misconfiguration, which means an increase in the entire network security of the IIoT system. Such features in this space helps users feel comfortable with the technology of TSN and compete effectively. A combination with automated security configuration may be helpful to provide a holistic architecture.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates an example arrangement of an industrial network 100 that is configured as a converged industrial network. The industrial network 100 includes a plurality of network devices 102a-102d configured as a TSN network. In configurations, the industrial network 100 may include additional network devices or fewer network devices. The industrial network 100 also includes two end stations 104a, 104b (also referred to as endpoints or end devices) coupled together by the network devices 102a-102d. In configurations, the industrial network 100 may include additional end devices.

The example arrangement of the industrial network 100 also includes a network controller 106. In configurations, the network controller includes a central network controller (CNC) 108a and a centralized user configuration (CUC) 108b. A user 110 uses an engineering tool 112, e.g., a computing device, to communicate with the network controller 106 to define workflows for the end stations 104a, 104b. As will be described further herein, the example arrangement of the industrial network 100 includes a policy and identity engine 114 and a key server 116.

As previously noted, in configurations, the converged and scheduled (time-sensitive) network 100 is based on the definition of streams between the end stations 104a, 104b through the switched network or over a wireless-TSN (scheduled WiFi-7) of the network devices 102a-102d. The schedule is based on an algorithm used by the network controller 106 that determines the path through the network 100 depending on network requirements such as bandwidth and latency. In the controller-based architecture, this is accomplished by a logical component (e.g., the CNC 108a in the context of IEEE 802.1TSN). Part of this algorithm-based calculation is the configuration of the end stations 104a, 104b, which are the sender and receiver of messages as streams. This configuration includes the source and destination medium access control (MAC) addresses as well as the stream-identifiers (IDs), (MAC address and virtual local area network (VLAN)-ID) for the individual streams between the end stations 104a, 104b.

This exclusive "view" on the network 100, as well as on the streams, enables fine granular access control as well as integrated and automated credential (key) management. This entails the following pre-conditions and initial steps.

The converged industrial network 100 is dynamically configured and scheduled based on the centralized network controller 106 that connects the end stations 104a, 104b in an operational technology (OT) scenario (e.g., control and automation).

The engineering tool 112 that is connected to the network controller 106 (containing the CNC 108a and the CUC 108b) provides capabilities to define the underlying workflows in the OT solution and the industrial network 100. This includes the connectivity between the end stations 104a, 104b and the related requirements pertaining to the workflows.

Based on information derived from an engineering process, the network controller 106 calculates the path through the industrial network 100, e.g., the TSN network of network devices 102a-102d. This path connects the end stations 104a, 104b of the industrial network 100 and meets essential network requirements such as bandwidth and latency. Furthermore, the network controller 106 assigns the stream-IDs (MAC address+VLAN-ID).

The network controller 106 sends the information containing the scheduled traffic (referred to as schedules) to the end stations 104a, 104b as well as to the network devices 102a-102d (switches, routers, etc.).

Based on the information containing the scheduled traffic, the network controller 106 is aware of all stream-IDs and all MAC addresses, e.g., the MAC addresses of the network devices 102a-102d as well as of the end stations 104a, 104b.

Figure 1B:
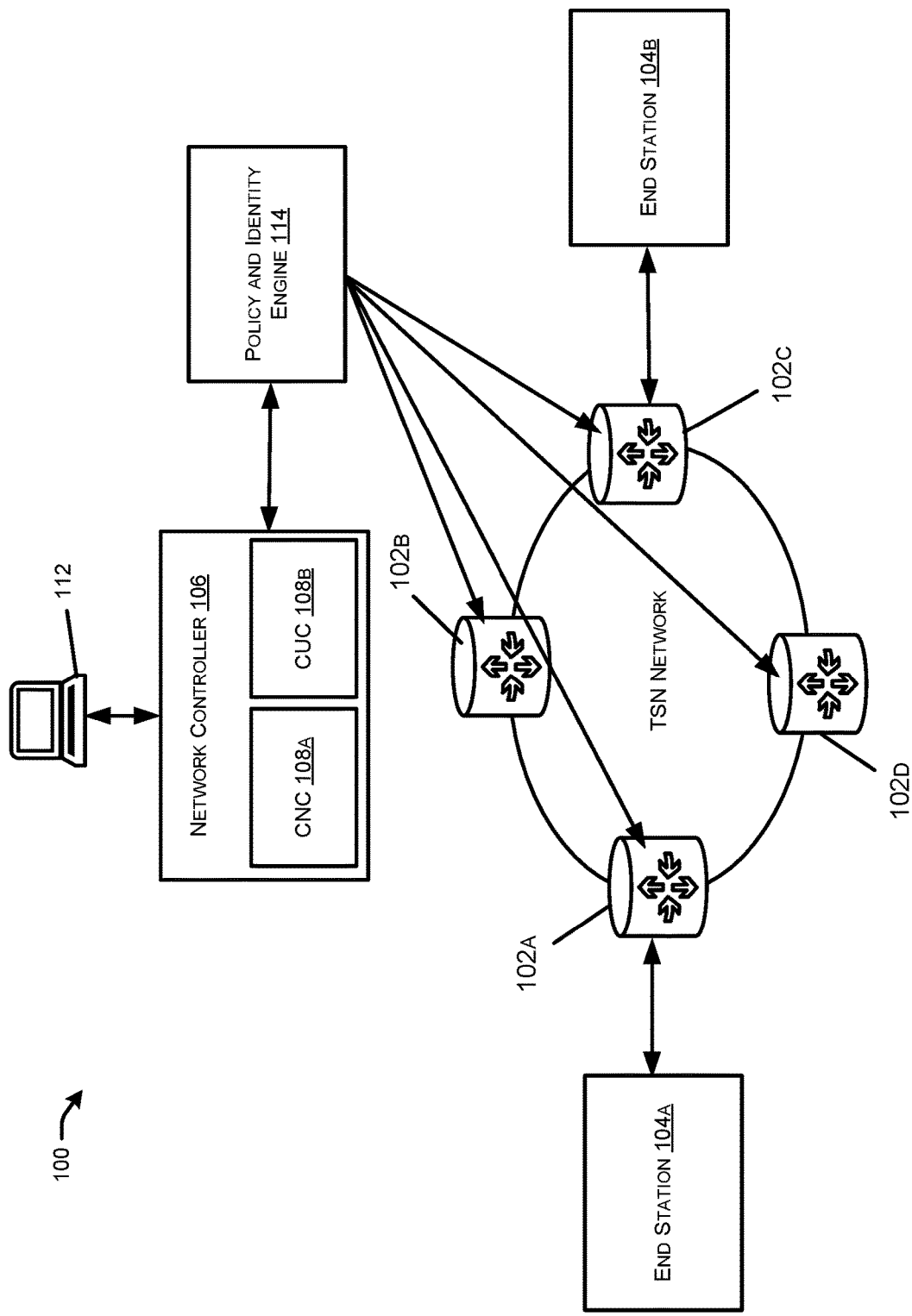

Referring to FIG. 1B, the example industrial network 100 is schematically illustrated without the key server 116. In configurations, for dynamic access control and use of this control, using the stream-IDs and MAC addresses, the network controller 106 provides the stream-IDs, the flows (commutated path) between the end stations 104a, 104b, and schedules to the policy and identity engine 114. The policy and identity engine 114 configures the network devices 102a-102d based on the stream-IDs, the flows (commutated path) between the end stations 104a, 104b, and schedules. This entails ingress filtering as well as firewall rules based on stream identification and handling, depending on network device capabilities. In addition to filtering and blocking, the known schedules allow access control capabilities based on timing aspects related to the streams. The entire process is dynamic and allows quick response and reconfiguration based on changes in the network, e.g., removal and/or addition of end stations and/or network devices, and stream configuration, as well as changes to the schedules.

Figure 1C:
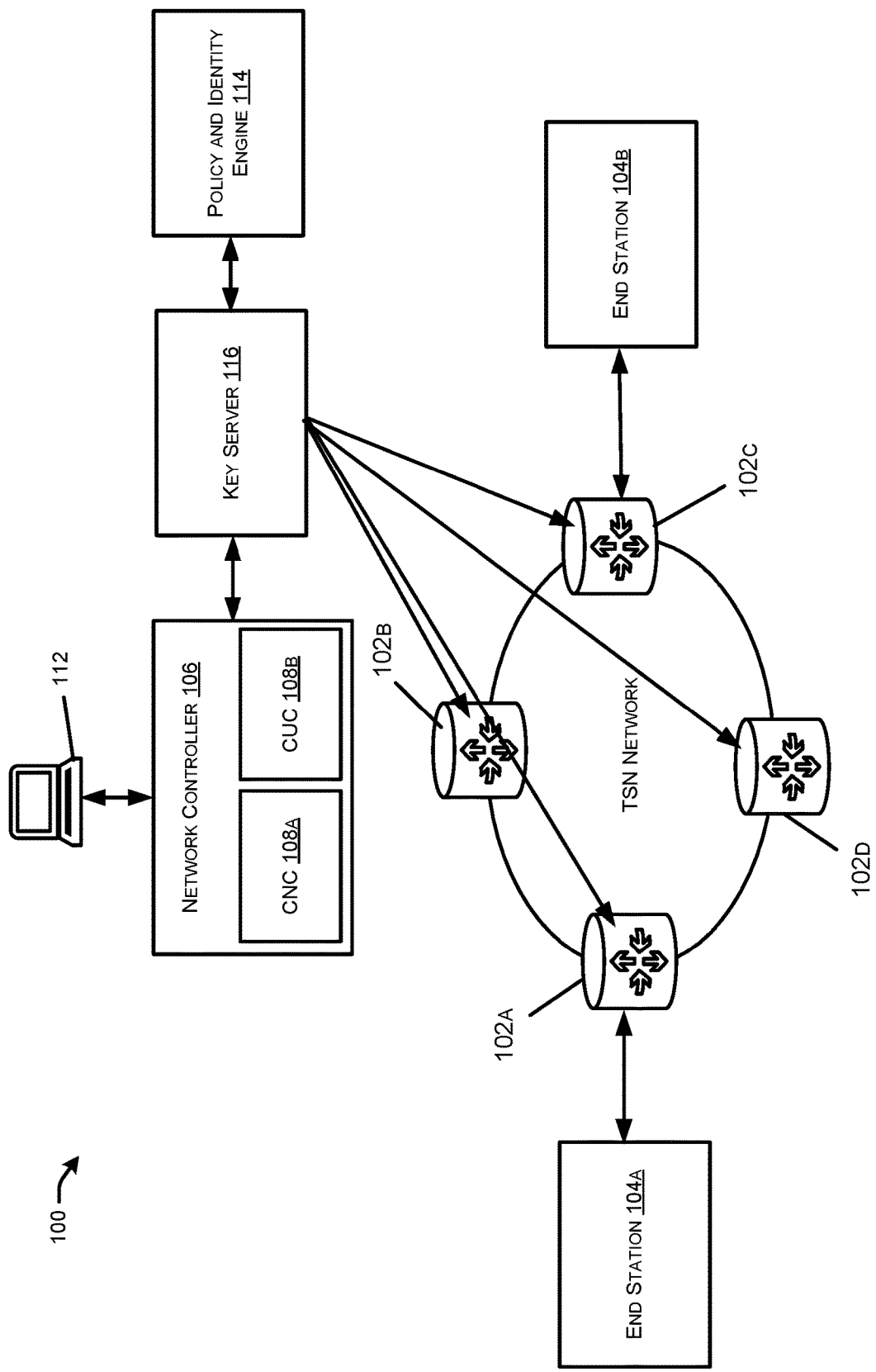

Referring to FIG. 1C, in configurations, for dynamic key management, using the stream-IDs and MAC addresses, the network controller 106 connects to the key server 116 that provides key management functions. The network controller 106 provides information regarding the end stations 104a, 104b (MAC Addresses) and the flows (commutated path) between the end stations 104a, 104b. The key server 116 generates the keys and distributes the keys to the receiving entities. In configurations, a receiving entity may be, for example, the sender and receiver of a stream (the end stations 104a, 104b). The keys may be used for transport or higher layer security. In configurations, a receiving entity may be, for example, all points of a stream (path through the industrial network 100) that includes the end stations 104a, 104b as well as the bridges, e.g., the network devices 102a-102d. The keys may be used for Ethernet link layer security (e.g., IEEE 802.1AE). Following a successful key deployment and the establishment of protocol security, the flow definition through the network is complete and secured by the cryptographic means based on the distributed keys. In addition to security policies (such as key-renewal), any change to the flow definitions based on all points of a stream (path through the industrial network 100) that includes the end stations 104a, 104b as well as the bridges e.g., network devices 102a-102d, triggers the process of key generation and distributions again to address these changes and related security needs. Once the process is completed, the industrial network 100 has exact end-to-end security, e.g., encryption (depending on the use of the keys).

Figure 2:
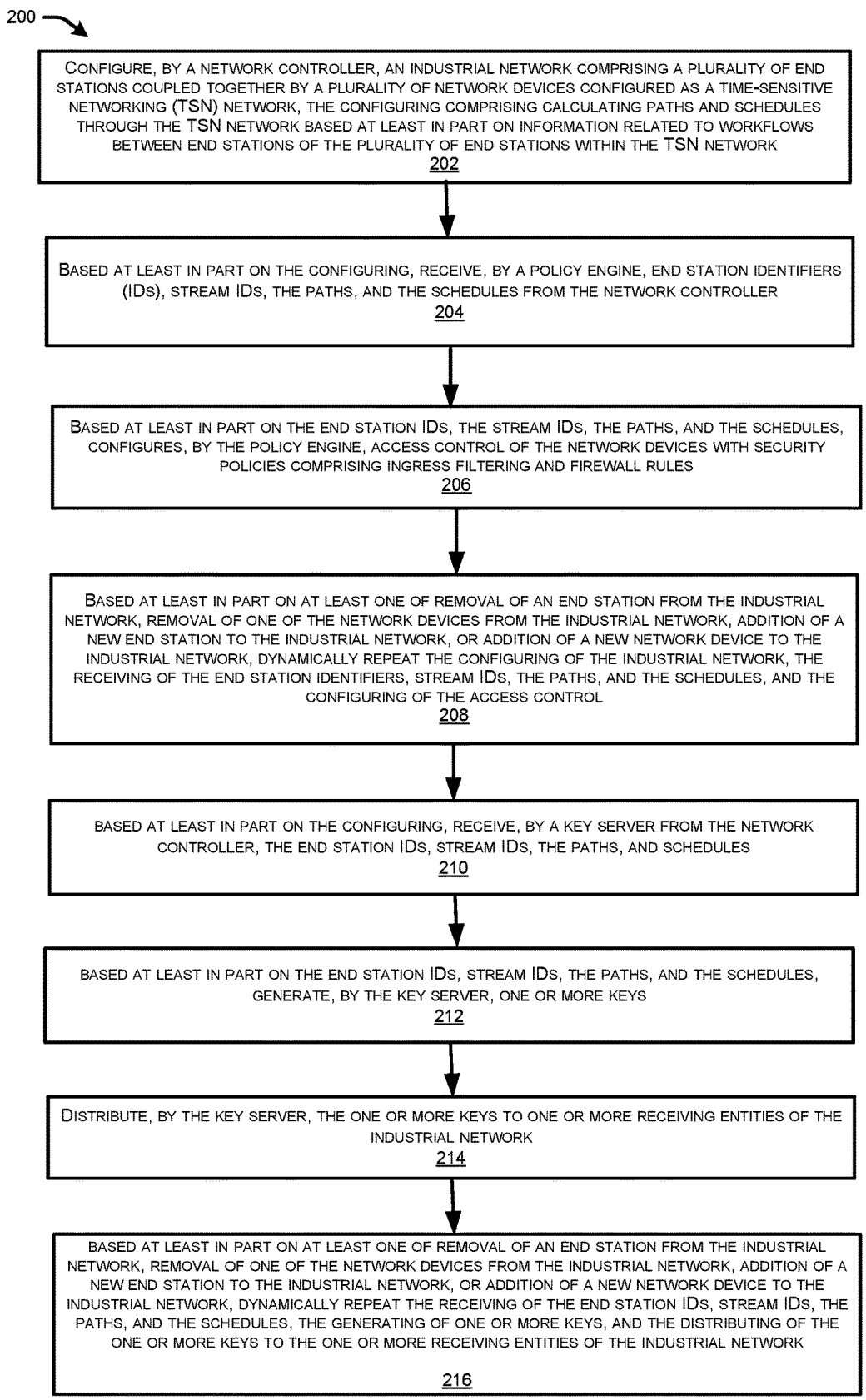
FIG. 2 illustrates a flow diagram of an example method for dynamic access control and use of this access control, as well as dynamic key management, for industrial networks, e.g., the example arrangements of the industrial network of FIGS. 1A-1C, in accordance with the techniques and architecture described herein.

FIG. 2 illustrates a flow diagram of an example method 200 and illustrates aspects of the functions performed at least partly by devices of a network as described with respect to FIGS. 1A, 1B, and 1C. The logical operations described herein with respect to FIG. 2 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 2 illustrates a flow diagram of an example method 200 for dynamic access control and use of this access control, as well as dynamic key management, for industrial networks. In some examples, the method 200 may be performed by a system comprising one or more processors and one or more non-transitory computer-readable media storing computer-executable instructions that, when executed by the one or more processors, cause the one or more processors to perform the method 200.

At 202, a network controller configures an industrial network comprising a plurality of end stations coupled together by a plurality of network devices configured as a time-sensitive networking (TSN) network. The configuring may comprise calculating paths and schedules through the TSN network based at least in part on information related to workflows between end stations of the plurality of end stations within the TSN network.

For example, the converged industrial network 100 is dynamically configured and scheduled based on the centralized network controller 106 that connects the end stations

104*a*, 104*b* in an operational technology (OT) scenario (e.g., control and automation). The engineering tool 112 that is connected to the network controller 106 (containing the CNC 108*a* and the CUC 108*b*) provides capabilities to define the underlying workflows in the OT solution and the industrial network 100. This includes the connectivity between the end stations 104*a*, 104*b* and the related requirements pertaining to the workflows.

Based on information derived from an engineering process, the network controller 106 calculates the path through the industrial network 100, e.g., the TSN network of network devices 102*a*-102*d*. This path connects the end stations 104*a*, 104*b* of the industrial network 100 and meets essential network requirements such as bandwidth and latency. Furthermore, the network controller 106 assigns the stream-IDs (MAC address+VLAN-ID).

The network controller 106 sends the information containing the scheduled traffic (referred to as schedules) to the end stations 104*a*, 104*b* as well as to the network devices 102*a*-102*d* (switches, routers, etc.). Based on the information containing the scheduled traffic, the network controller 106 is aware of all stream-IDs and all MAC addresses, e.g., the MAC addresses of the network devices 102*a*-102*d* as well as of the end stations 104*a*, 104*b*

At 204, based at least in part on the configuring, a policy engine receives end station identifiers (IDs), stream IDs, the paths, and the schedules from the network controller. At 206, based at least in part on the end station IDs, the stream IDs, the paths, and the schedules, the policy engine configures access control of the network devices with security policies comprising ingress filtering and firewall rules.

For example, for dynamic access control and use of this access control, using the stream-IDs and MAC addresses, the network controller 106 provides the stream-IDs, the flows (commutated path) between the end stations 104*a*, 104*b*, and schedules to the policy and identity engine 114. The policy and identity engine 114 configures the network devices 102*a*-102*d* based on the stream-IDs, the flows (commutated path) between the end stations 104*a*, 104*b*, and schedules. This entails ingress filtering as well as firewall rules based on stream identification and handling, depending on network device capabilities. In addition to filtering and blocking, the known schedules allow access control capabilities based on timing aspects related to the streams.

At 208, based at least in part on at least one of removal of an end station from the industrial network, removal of one of the network devices from the industrial network, addition of a new end station to the industrial network, or addition of a new network device to the industrial network, the configuring of the industrial network may be dynamically repeated, as well as the receiving of the end station identifiers, stream IDs, the paths, and the schedules, and the configuring of the access control. For example, the entire process is dynamic and allows quick response and reconfiguration based on changes in the network, e.g., removal and/or addition of end stations and/or network devices, and stream configuration, as well as changes to the schedules.

At 210, based at least in part on the configuring, a key server receives, from the network controller, the end station IDs, stream IDs, the paths, and schedules. At 212, based at least in part on the end station IDs, stream IDs, the paths, and the schedules, the key server generates one or more keys. At 214, the key server distributes the one or more keys to one or more receiving entities of the industrial network. In configurations, the one or more receiving entities comprise two or more end stations. In configurations, the one or more receiving entities comprise two or more end stations and one or more network devices. For example, for dynamic key management, using the stream-IDs and MAC addresses, the network controller 106 connects to the key server 116 that provides key management functions. The network controller 106 provides information regarding the end stations 104*a*, 104*b* (MAC Addresses) and the flows (commutated path) between the end stations 104*a*, 104*b*. The key server 116 generates the keys and distributes the keys to the receiving entities. In configurations, a receiving entity may be, for example, the sender and receiver of a stream (the end stations 104*a*, 104*b*). The keys may be used for transport or higher layer security. In configurations, a receiving entity may be, for example, all points of a stream (path through the industrial network 100) that includes the end stations 104*a*, 104*b* as well as the bridges, e.g., the network devices 102*a*-102*d*. The keys may be used for Ethernet link layer security (e.g., IEEE 802.1AE). Following a successful key deployment and the establishment of protocol security, the flow definition through the network is complete and secured by the cryptographic means based on the distributed keys.

At 216, based at least in part on at least one of removal of an end station from the industrial network, removal of one of the network devices from the industrial network, addition of a new end station to the industrial network, or addition of a new network device to the industrial network, the receiving of the end station IDs, stream IDs, the paths, and the schedules, the generating of one or more keys, and the distributing of the one or more keys to the one or more receiving entities of the industrial network are dynamically repeated. For example, in addition to security policies (such as key-renewal), any change to the flow definitions based on all points of a stream (path through the industrial network 100) that includes the end stations 104*a*, 104*b* as well as the bridges e.g., network devices 102*a*-102*d*, triggers the process of key generation and distributions again to address these changes and related security needs. Once the process is completed, the industrial network 100 has exact end-to-end security, e.g., encryption (depending on the use of the keys).

Thus, the techniques and architecture described herein allow for integration of the management of network security tightly into network management for converged networks. Configuration data is used to generate and manage key material, which is needed for the flows computed and configured by the centralized controller. This allows exact end-to-end security, e.g., encryption (depending on the use of the keys). In addition, any change in the configuration of the converged, scheduled network may be addressed and integrated automatically in order to manage the security credentials and to generate and provide new key material. This automates the security management and makes the entire network less prone to misconfiguration, which means an increase in the entire network security of the IIoT system. Such features in this space helps users feel comfortable with the technology of TSN and compete effectively. A combination with automated security configuration may be helpful to provide a holistic architecture.

Figure 3:
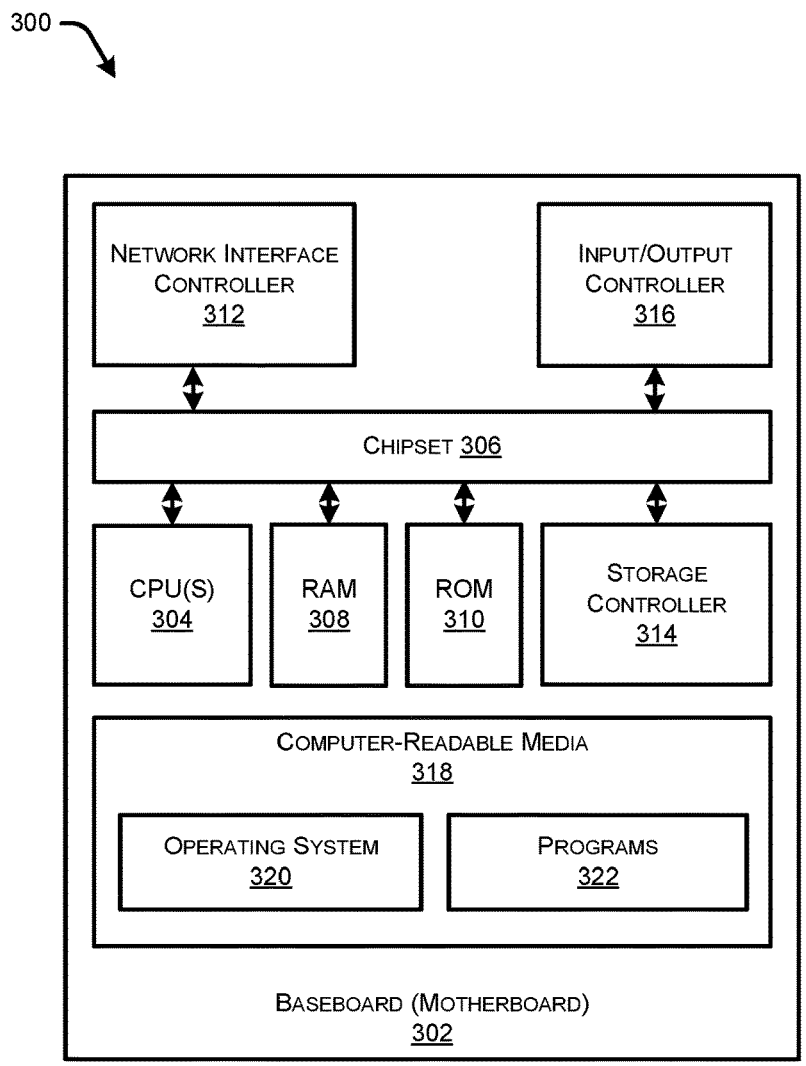
FIG. 3 is a computer architecture diagram showing an example computer hardware architecture for implementing a device that can be utilized to implement aspects of the various technologies presented herein.

FIG. 3 shows an example computer architecture for a computing device 300 capable of executing program components for implementing the functionality described above. In configurations, one or more of the computing devices 300 may be used to implement one or more of the components of FIGS. 1A, 1B, 1C, and 2. The computer architecture shown in FIG. 3 illustrates a conventional server computer, router, switch, workstation, desktop computer, laptop, tablet, network appliance, e-reader, smartphone, or other computing device, and can be utilized to execute any of the software components presented herein. The computing device 300 may, in some examples, correspond to a physical device or resources described herein.

The computing device 300 includes a baseboard 302, or "motherboard," which is a printed circuit board to which a multitude of components or devices can be connected by way of a system bus or other electrical communication paths. In one illustrative configuration, one or more central processing units ("CPUs") 304 operate in conjunction with a chipset 306. The CPUs 304 can be standard programmable processors that perform arithmetic and logical operations necessary for the operation of the computing device 300.

The CPUs 304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 306 provides an interface between the CPUs 304 and the remainder of the components and devices on the baseboard 302. The chipset 306 can provide an interface to a RAM 308, used as the main memory in the computing device 300. The chipset 306 can further provide an interface to a computer-readable storage medium such as a read-only memory ("ROM") 310 or non-volatile RAM ("NVRAM") for storing basic routines that help to startup the computing device 300 and to transfer information between the various components and devices. The ROM 310 or NVRAM can also store other software components necessary for the operation of the computing device 300 in accordance with the configurations described herein.

The computing device 300 can operate in a networked environment using logical connections to remote computing devices and computer systems through a network, such as the example arrangement of industrial network 100. The chipset 306 can include functionality for providing network connectivity through a NIC 312, such as a gigabit Ethernet adapter. In configurations, the NIC 312 can be a smart NIC (based on data processing units (DPUs)) that can be plugged into data center servers to provide networking capability. The NIC 312 is capable of connecting the computing device 300 to other computing devices over networks. It should be appreciated that multiple NICs 312 can be present in the computing device 300, connecting the computer to other types of networks and remote computer systems.

The computing device 300 can include a storage device 318 that provides non-volatile storage for the computer. The storage device 318 can store an operating system 320, programs 322, and data, which have been described in greater detail herein. The storage device 318 can be connected to the computing device 300 through a storage controller 314 connected to the chipset 306. The storage device 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 300 can store data on the storage device 318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 318 is characterized as primary or secondary storage, and the like.

For example, the computing device 300 can store information to the storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 300 can further read information from the storage device 318 by detecting the physical states or characteristics of one or more particular locations within the physical storage units.

In addition to the mass storage device 318 described above, the computing device 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 300. In some examples, the operations performed by the cloud network, and or any components included therein, may be supported by one or more devices similar to computing device 300. Stated otherwise, some or all of the operations described herein may be performed by one or more computing devices 300 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 318 can store an operating system 320 utilized to control the operation of the computing device 300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 318 can store other system or application programs and data utilized by the computing device 300.

In one embodiment, the storage device 318 or other computer-readable storage media is encoded with computer-executable instructions which, when loaded into the computing device 300, transform the computer from a generalpurpose computing system into a special-purpose computer capable of implementing the embodiments described herein. These computer-executable instructions transform the computing device 300 by specifying how the CPUs 304 transition between states, as described above. According to one embodiment, the computing device 300 has access to computer-readable storage media storing computer-executable instructions which, when executed by the computing device 300, perform the various processes described above with regard to FIGS. 1A, 1B, 1C, and 2. The computing device 300 can also include computer-readable storage media having instructions stored thereupon for performing any of the other computer-implemented operations described herein.

The computing device 300 can also include one or more input/output controllers 316 for receiving and processing input from a number of input devices, such as a keyboard, a mouse, a touchpad, a touch screen, an electronic stylus, or other type of input device. Similarly, an input/output controller 316 can provide output to a display, such as a computer monitor, a flat-panel display, a digital projector, a printer, or other type of output device. It will be appreciated that the computing device 300 might not include all of the components shown in FIG. 3, can include other components that are not explicitly shown in FIG. 3, or might utilize an architecture completely different than that shown in FIG. 3.

The computing device 300 may support a virtualization layer, such as one or more virtual resources executing on the computing device 300. In some examples, the virtualization layer may be supported by a hypervisor that provides one or more virtual machines running on the computing device 300 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    configuring, by a network controller, an industrial network comprising a plurality of end stations coupled together by a plurality of network devices configured as a time-sensitive networking (TSN) network, wherein the configuring comprises calculating paths and schedules through the TSN network based at least in part on information related to workflows between end stations of the plurality of end stations within the TSN network;
    based at least in part on the configuring, receiving, at a policy engine from the network controller, end station identifiers (IDs), stream IDs, the paths, and the schedules;
    based at least in part on the end station IDs, the stream IDs, the paths, and the schedules, configuring, by the policy engine, access control of the network devices with security policies comprising ingress filtering and firewall rules;
    based at least in part on the configuring, receiving, at a key server from the network controller, the end station IDs, stream IDs, the paths, and the schedules;
    based at least in part on the end station IDs, stream IDs, the paths, and the schedules, generating, by the key server, one or more keys;
    distributing, by the key server, the one or more keys to one or more receiving entities of the industrial network; and
    based at least in part on any change including at least one of (i) removal of an end station from the industrial network, (ii) removal of one of the network devices from the industrial network, (iii) addition of a new end station to the industrial network, or (iv) addition of a new network device to the industrial network, dynamically repeating the configuring of the industrial network, the receiving of the end station IDs, stream IDs, the paths, and the schedules, and the configuring of the access control and automatically integrating the change to generate new key material needed for flows computed and configured by the network controller.

2. The method of claim 1, wherein configuring the access control of the network devices further comprises configuring the access control of the network devices based on timing aspects related to streams between end stations.

3. The method of claim 1, wherein:
    configuring the industrial network further comprises receiving, at the controller from an engineering tool, capabilities of the industrial network including connectivity between the plurality of end stations and related requirements pertaining to the workflows; and
    configuring the industrial network is based at least in part on the capabilities of the industrial network including connectivity between the plurality of end stations and the related requirements pertaining to the workflows.

4. The method of claim 3, wherein calculating the paths and schedules is based at least in part on the capabilities of the industrial network including connectivity between the plurality of end stations and the related requirements pertaining to the workflows.

5. The method of claim 1, wherein the one or more receiving entities comprise two or more end stations.

6. The method of claim 1, wherein the one or more receiving entities comprise two or more end stations and one or more network devices.

7. The method of claim 1, further comprising:
    based at least in part on at least one of (i) removal of an end station from the industrial network, (ii) removal of one of the network devices from the industrial network, (iii) addition of a new end station to the industrial network, or (iv) addition of a new network device to the industrial network, dynamically repeating the receiving of the end station IDs, stream IDs, the paths, and the schedules, the generating of one or more keys, and the distributing of the one or more keys to the one or more receiving entities of the industrial network.

8. A system comprising:
    one or more processors; and
    one or more non-transitory computer-readable media storing computer-executable instructions that, when executed by the one or more processors, cause the one or more processors to perform actions comprising:
        configuring, by a network controller, an industrial network comprising a plurality of end stations coupled together by a plurality of network devices configured as a time-sensitive networking (TSN) network, wherein the configuring comprises calculating paths and schedules through the TSN network based at least in part on information related to workflows between end stations of the plurality of end stations within the TSN network;

based at least in part on the configuring, receiving, at a policy engine from the network controller, end station identifiers (IDs), stream IDs, the paths, and the schedules;

based at least in part on the end station IDs, the stream IDs, the paths, and the schedules, configuring, by the policy engine, access control of the network devices with security policies comprising ingress filtering and firewall rules;

based at least in part on the configuring, receiving, at a key server from the network controller, the end station IDs, stream IDs, the paths, and the schedules;

based at least in part on the end station IDs, stream IDs, the paths, and the schedules, generating, by the key server, one or more keys;

distributing, by the key server, the one or more keys to one or more receiving entities of the industrial network; and based at least in part on any change including at least one of (i) removal of an end station from the industrial network, (ii) removal of one of the network devices from the industrial network, (iii) addition of a new end station to the industrial network, or (iv) addition of a new network device to the industrial network, dynamically repeating the configuring of the industrial network, the receiving of the end station IDs, stream IDs, the paths, and the schedules, and the configuring of the access control and automatically integrating the change to generate new key material needed for flows computed and configured by the network controller.

9. The system of claim 8, wherein configuring the access control of the network devices further comprises configuring the access control of the network devices based on timing aspects related to streams between end stations.

10. The system of claim 8, wherein:
configuring the industrial network further comprises receiving, at the controller from an engineering tool, capabilities of the industrial network including connectivity between the plurality of end stations and related requirements pertaining to the workflows; and
configuring the industrial network is based at least in part on the capabilities of the industrial network including connectivity between the plurality of end stations and the related requirements pertaining to the workflows.

11. The system of claim 10, wherein calculating the paths and schedules is based at least in part on the capabilities of the industrial network including connectivity between the plurality of end stations and the related requirements pertaining to the workflows.

12. The system of claim 8, wherein the one or more receiving entities comprise two or more end stations.

13. The system of claim 8, wherein the one or more receiving entities comprise two or more end stations and one or more network devices.

14. The system of claim 8, wherein the actions further comprise:
based at least in part on at least one of (i) removal of an end station from the industrial network, (ii) removal of one of the network devices from the industrial network, (iii) addition of a new end station to the industrial network, or (iv) addition of a new network device to the industrial network, dynamically repeating the receiving of the end station IDs, stream IDs, the paths, and the schedules, the generating of one or more keys, and the distributing of the one or more keys to the one or more receiving entities of the industrial network.

15. One or more non-transitory computer-readable media storing computer-executable instructions that, when executed by one or more processors, cause the one or more processors to perform actions comprising:
configuring, by a network controller, an industrial network comprising a plurality of end stations coupled together by a plurality of network devices configured as a time-sensitive networking (TSN) network, wherein the configuring comprises calculating paths and schedules through the TSN network based at least in part on information related to workflows between end stations of the plurality of end stations within the TSN network;

based at least in part on the configuring, receiving, at a policy engine from the network controller, end station identifiers (IDs), stream IDs, the paths, and the schedules;

based at least in part on the end station IDs, the stream IDs, the paths, and the schedules, configuring, by the policy engine, access control of the network devices with security policies comprising ingress filtering and firewall rules;

based at least in part on the configuring, receiving, at a key server from the network controller, the end station IDs, stream IDs, the paths, and the schedules;

based at least in part on the end station IDs, stream IDs, the paths, and the schedules, generating, by the key server, one or more keys;

distributing, by the key server, the one or more keys to one or more receiving entities of the industrial network; and based at least in part on any change including at least one of (i) removal of an end station from the industrial network, (ii) removal of one of the network devices from the industrial network, (iii) addition of a new end station to the industrial network, or (iv) addition of a new network device to the industrial network, dynamically repeating the configuring of the industrial network, the receiving of the end station IDs, stream IDs, the paths, and the schedules, and the configuring of the access control and automatically integrating the change to generate new key material needed for flows computed and configured by the network controller.

16. The one or more non-transitory computer-readable media of claim 15, wherein:
configuring the industrial network further comprises receiving, at the controller from an engineering tool, capabilities of the industrial network including connectivity between the plurality of end stations and related requirements pertaining to the workflows; and
configuring the industrial network is based at least in part on the capabilities of the industrial network including connectivity between the plurality of end stations and the related requirements pertaining to the workflows,
wherein calculating the paths and schedules is based at least in part on the capabilities of the industrial network including connectivity between the plurality of end stations and the related requirements pertaining to the workflows.

17. The one or more non-transitory computer-readable media of claim 15, wherein the actions further comprise:
based at least in part on at least one of (i) removal of an end station from the industrial network, (ii) removal of one of the network devices from the industrial network, (iii) addition of a new end station to the industrial network, or (iv) addition of a new network device to the industrial network, dynamically repeating the receiving of the end station IDs, stream IDs, the paths, and the schedules, the generating of one or more keys, and the distributing of the one or more keys to the one or more receiving entities of the industrial network.

18. The one or more non-transitory computer-readable media of claim 15, wherein the one or more receiving entities comprise two or more end stations and one or more network devices.

19. The one or more non-transitory computer-readable media of claim 15, wherein the actions further comprise:
based at least in part on at least one of (i) removal of an end station from the industrial network, (ii) removal of one of the network devices from the industrial network, (iii) addition of a new end station to the industrial network, or (iv) addition of a new network device to the industrial network, dynamically repeating the receiving of the end station IDs, stream IDs, the paths, and the schedules, the generating of one or more keys, and the distributing of the one or more keys to the one or more receiving entities of the industrial network.

* * * * *